US012743801B2

(12) United States Patent
Denney

(10) Patent No.: US 12,743,801 B2
(45) Date of Patent: Sep. 22, 2026

(54) APPARATUS AND METHOD FOR GENERATING DEPTH MAPS FROM RAW DUAL PIXEL SENSOR DATA

(71) Applicant: CANON KABUSHIKI KAISHA, Tokyo (JP)

(72) Inventor: Bradley Scott Denney, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/836,210

(22) PCT Filed: Feb. 10, 2023

(86) PCT No.: PCT/US2023/012766
§ 371 (c)(1),
(2) Date: Aug. 6, 2024

(87) PCT Pub. No.: WO2023/154431
PCT Pub. Date: Aug. 17, 2023

(65) Prior Publication Data

US 2025/0157062 A1 May 15, 2025

Related U.S. Application Data

(60) Provisional application No. 63/309,328, filed on Feb. 11, 2022.

(51) Int. Cl.

| | |
|---|---|
| ***G06T 7/50*** | (2017.01) |
| ***G06T 17/20*** | (2006.01) |
| ***H04N 25/70*** | (2023.01) |

(52) U.S. Cl.
CPC ................ *G06T 7/50* (2017.01); *G06T 17/20* (2013.01); *H04N 25/70* (2023.01); *G06T 2207/10024* (2013.01)

(58) Field of Classification Search
CPC ....................... G06T 7/50; G06T 17/20; G06T 2207/10024; G06T 7/55; G06T 7/32; H04N 25/70
USPC .......................................................... 348/302
See application file for complete search history.

(56) References Cited

U.S. PATENT DOCUMENTS

| | | | | |
|---|---|---|---|---|
| 9,401,039 | B2 * | 7/2016 | Maeda | H04N 13/111 |
| 9,892,534 | B2 * | 2/2018 | Yoo | G06T 11/40 |
| 2002/0097342 | A1 | 7/2002 | Hu | |
| 2020/0210690 | A1 | 7/2020 | Han et al. | |

(Continued)

FOREIGN PATENT DOCUMENTS

| | | | |
|---|---|---|---|
| WO | 2020-102584 | A1 | 5/2020 |

*Primary Examiner* — Usman A Khan
(74) *Attorney, Agent, or Firm* — Canon U.S.A., Inc., IP Division

(57) ABSTRACT

An image processing apparatus and method for generating a sub-pixel alignment estimate from dual-pixel sensor data is provided. The method includes parametrically fitting at least two signals observed across a two dual-pixels of the dual-pixel sensor in the direction of the dual-pixel split, generating at least one bilinear measure on the at least two signals' fitting parameters, determining an alignment confidence based at least in part on the at least one bilinear measure on the at least two signals' fitting parameters, and determining the sub-pixel alignment estimate based at least in part on the at least one bilinear measure on the at least two signals' fitting parameters.

17 Claims, 7 Drawing Sheets

(56) References Cited

U.S. PATENT DOCUMENTS

| | | | | |
|---|---|---|---|---|
| 2020/0242788 | A1* | 7/2020 | Jacobs | H04N 23/631 |
| 2021/0056349 | A1* | 2/2021 | Knaan | G06T 7/593 |

* cited by examiner

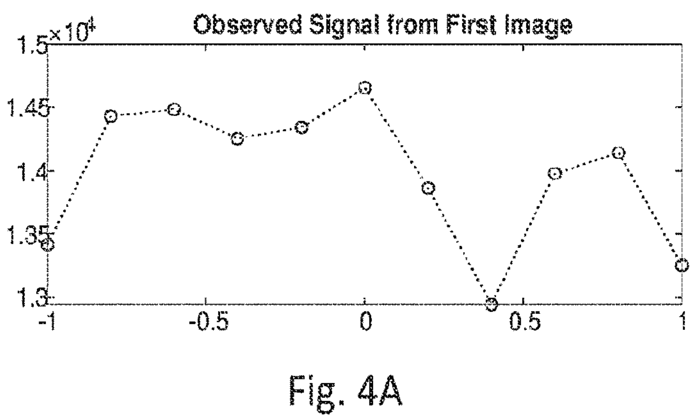
Fig. 4A
Observed Signal from Second Image
×10^4
1.6
1.5
1.4
1.3
1.2
-1
-0.5
0
0.5
1
Fig. 4B
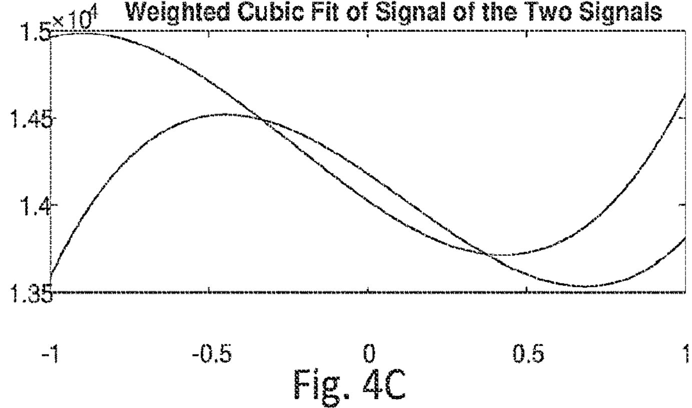
Fig. 4C
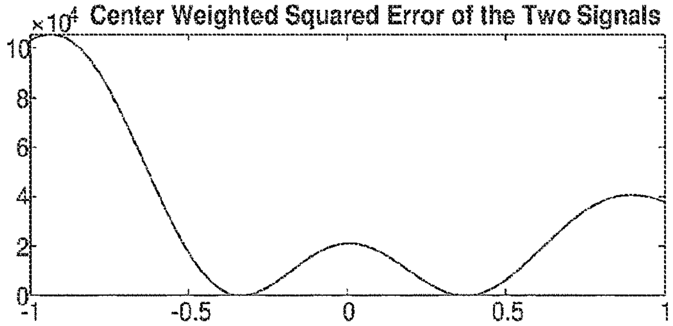
Fig. 4D

APPARATUS AND METHOD FOR GENERATING DEPTH MAPS FROM RAW DUAL PIXEL SENSOR DATA

CROSS-REFERENCE TO RELATED APPLICATIONS

This application is a National Phase application of International Application No. PCT/US2023/012766, filed Feb. 10, 2023, which claims the benefit of priority from U.S. Provisional Patent Application Ser. No. 63/309,328 filed on Feb. 11, 2022, the entirety of both application are incorporated herein by reference.

BACKGROUND

Field

The present disclosure relates to an image processing technique used with a dual-pixel sensor.

Description of Related Art

Dual pixel sensors have become common in modern cameras due to their ability to perform fast focusing by examining the differential signals between the dual pixels at regions of interest such as eyes of people or animals, or other salient objects in a scene. Additionally, dual pixel raw data can also provide information about focus that relates to depth of objects relative to the focus depth. This is especially true when a lens with a large aperture allows for the pathways of the incoming light field to follow different paths when entering the dual pixels. Slight variations in the signals' positioning on the sensor from the differing pathways can account for changes in depth for different parts of the scene. In order to recover depth, sub-pixel alignment techniques may be used to estimate sub-pixel misalignments of the two paths of light onto the sensor.

An exemplary approach to sub-pixel alignment may involve taking a few pixels along the direction of the dual pixel separation from both dual pixel images, fitting the signals to a parametric model, interpolating the parametric model to some sub-pixel resolution shifting one interpolated signal with respect to the other, and determining the shift that minimizes the error between the two signals. One drawback with this exemplary processing includes increased computation power needed and a system and method according to the present disclosure remedies these drawbacks.

SUMMARY

An image processing apparatus and method for generating a sub-pixel alignment estimate from dual-pixel sensor data is provided. The method includes parametrically fitting at least two signals observed across a two dual-pixels of the dual-pixel sensor in the direction of the dual-pixel split, generating at least one bilinear measure on the at least two signals' fitting parameters, determining an alignment confidence based at least in part on the at least one bilinear measure on the at least two signals' fitting parameters, and determining the sub-pixel alignment estimate based at least in part on the at least one bilinear measure on the at least two signals' fitting parameters.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

FIG. 4A-4D illustrate observed signals and processing performed thereon according to the present disclosure.

Figure 1:
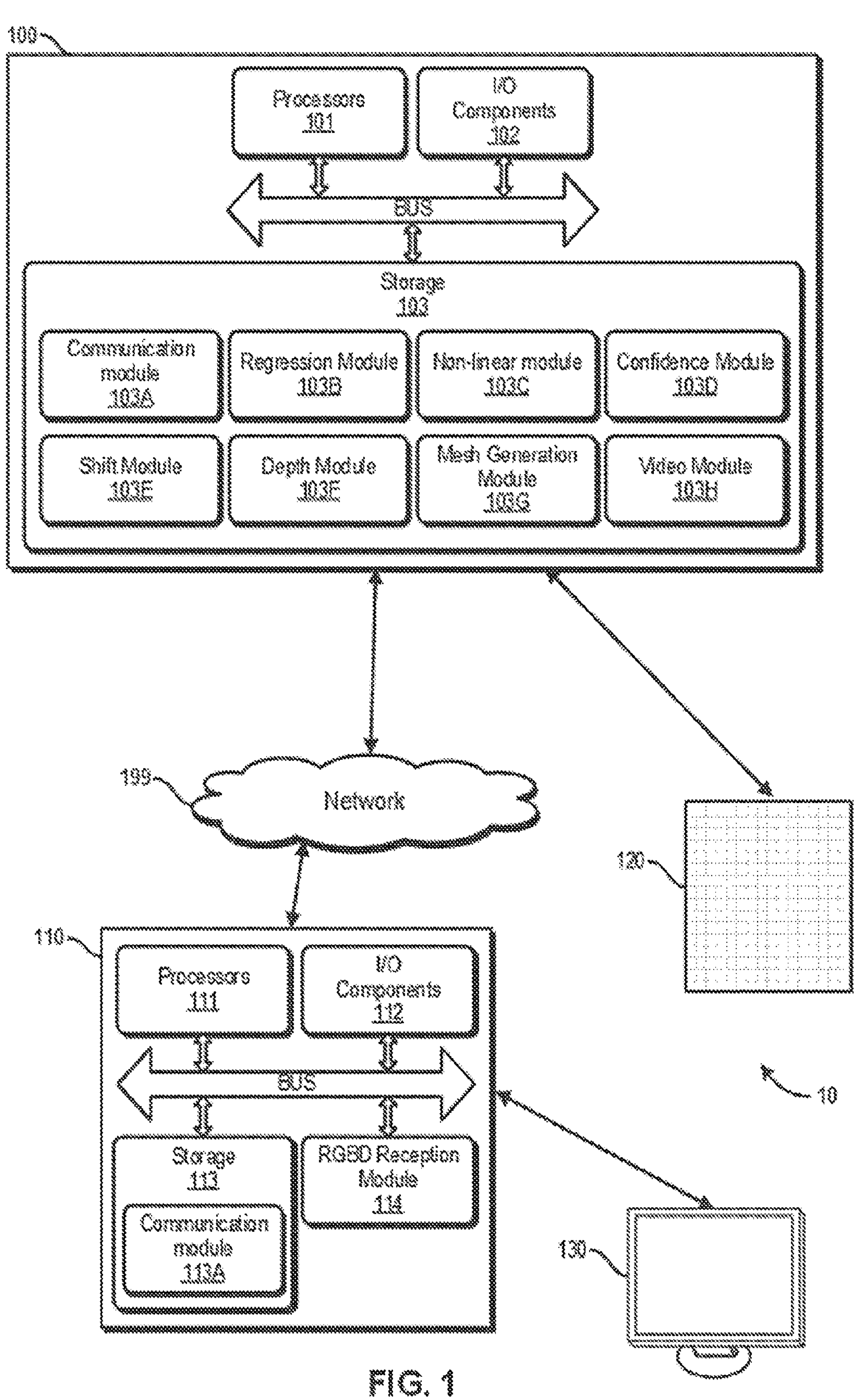
FIG. 1 illustrates the hardware architecture of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

According to the present disclosure an image processing technique is provided that advantageously determines depth maps from an image capture device with one or more sensors that are dual pixel image sensors. According the disclosure below, the conventional manner in which depth may be estimated is improved by providing an analytic determination of the depth map by approximating the two signals to be aligned and treating those signals as continuous functions where one function is allowed to shift by an arbitrary delta. In so doing, the error of the two functions is analyzed continuously and can be minimized over the period delta. Through an analysis of an analytical representation of the two signals, the optimal signal shift may be obtained in a single step rather than search over a range of discrete candidate steps, thereby making this method faster and capable of being done in real-time.

FIG. 1 illustrates an example embodiment of a system for generating a depth maps from an image capture device including a dual pixel sensor that is configured to convert light captured on the dual pixel sensor into electrical signals. The system 1 includes a capture device 100 and a receiving device 110 which are a specially-configured computing devices. In this embodiment, the capture device 100 and the receiving device 110 communicate via one or more networks 199, which may include a wired network, a wireless network, a LAN, a WAN, a MAN, and a PAN. Also, in some embodiments the devices communicate via other wired or wireless channels.

The two systems 100 and 110 include one or more respective processors 101 and 111, one or more respective I/O components 102 and 112, and respective storage 103 and 113. Also, the hardware components of the two systems 100 and 110 communicate via one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 101 and 111 include one or more central processing units (CPUs), which may include one or more microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits).

The I/O components 102 and 112 include communication components (e.g., a graphics card, a network-interface controller) that communicate with the respective image capture dual-pixel array 120 and a display device 130, the network 120, and other input or output devices (not illustrated), which may include a keyboard, a mouse, a printing device, a touch screen, a light pen, an optical-storage device, a scanner, a microphone, a drive, and a game controller (e.g., a joystick, a gamepad).

The storages 103 and 113 include one or more computer-readable storage media. As used herein, a computer-readable storage medium includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storages 103 and 113, which may include both ROM and RAM, can store computer-readable data or computer-executable instructions.

The two systems 100 and 110 also include respective communication modules 103A and 113A. A module includes logic, computer-readable data, or computer-executable instructions. In the embodiment shown in FIG. 11, the modules are implemented in software (e.g., Assembly, C, C++, C#, Java, BASIC, Perl, Visual Basic, Python, Swift). However, in some embodiments, the modules are implemented in hardware (e.g., customized circuitry) or, alternatively, a combination of software and hardware. When the modules are implemented, at least in part, in software, then the software can be stored in the storage 103 and 113. Also, in some embodiments, the two systems 100 and 110 includes additional or fewer modules, the modules are combined into fewer modules, or the modules are divided into more modules. One environment system may be similar to the other or may be different in terms of the inclusion or organization of the modules.

The regression module 103B includes operations programed to carry out linear or linear dual-pixel transformations as described in block 230 of FIG. 2 as described below. The non-linear module 103C includes operations programmed to carry out non-linear processing of the results of the regression module 103B as described for example in block 240 of FIG. 2 as described below. The confidence module 103D and the shift module 103E include instructions to compute the respective confidence and shift values for a location as described in block 250 of FIG. 2 as described below. The depth module 103F includes instructions that combine the confidence and shift values, for example by applying a confidence threshold to the confidence map and using the confidence locations above the threshold as a depth pixel mask. The mesh generation module 103G includes instructions to generate a 3-D mesh using one or more confident depth locations as one or more 3-dimensional mesh vertices and the subsequently applying a triangulization method to the vertices such as a Delauny triangularization method to generate a 3D mesh. The Video module 103H includes instructions to store or transmit still or streamed RGBD (red, green, blue, depth) images, or RGBD, or variants thereof, or 3-dimensional mesh data which may also include corresponding uv texture maps generated from the RGB pixel values of the captured image.

The RGBD representation module 114 of system 110 includes instructions to receive and process for viewing the incoming data generated from module 103H of system 100 via the network 199. The processing of the incoming data may include rendering the data on a 2-D display unit 130 or a stereo-graphic display or a holographic or light field display.

Figure 2:
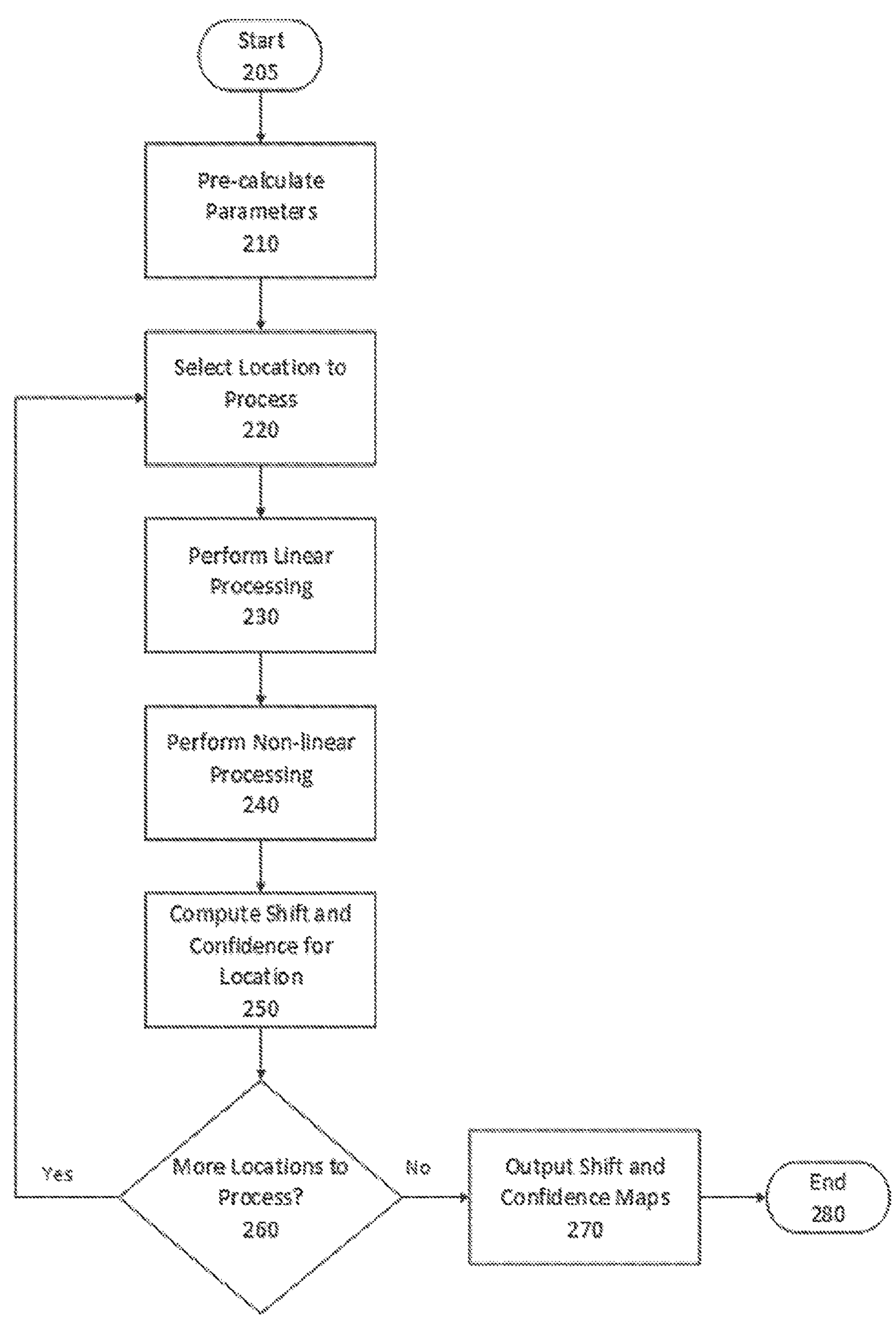
FIG. 2 illustrates an algorithm according to the present disclosure.

FIG. 2 illustrates an exemplary algorithm that is embodied as a set of instructions that are stored in a memory and executed by one or more of the hardware processors discussed above with respect to FIG. 1. The basis as to why the algorithm of FIG. 2 improves the ability to determine depth map information from a dual pixel sensor array can best be understood based on the following information. This description sets the foundation for the algorithmic processing shown in FIG. 2.

Initially, it is important to identify or otherwise obtain a polynomial approximation of local signals from the dual pixel sensor in the image capture device. Thus, for a signal of interest s(x) centered around x=0 with observations $s=\{s_1, s_2, \ldots, s_N\}$ taken at $\{x_1, x_2, \ldots, x_N\}$. The signal may be approximated via polynomial regression calculation such that $$s(x) \approx p(x;a)$$

where p(x; a) is a polynomial of x with polynomial coefficients a. Thereafter, the polynomials are parameterized by their coefficients:

$$a = [a_p, \ldots, a_0]^T$$

$$p(x; a) = \sum_{k=0}^{p} a_k x^k = x_p^T a$$

$$x_p = [x^p, \ldots, x, 1]^T$$

This leads to regression processing to be performed whereby the problem can be formulated as s≈Xa $$\begin{bmatrix} s_1 \\ \vdots \\ s_N \end{bmatrix} \approx \begin{bmatrix} x_1^p & \ldots & x_1^0 \\ \vdots & \ddots & \vdots \\ x_N^p & \ldots & x_N^0 \end{bmatrix} a$$

Processing is then performed to minimize the error of the regression where the following is obtained $$\min_a [s - Xa]^T [s - Xa]$$

Sometimes the error between observed samples and the polynomial are weighted to focus the attention of the regression on the center of the sampled signal. This involves the inclusion of a weighting matrix which is typically diagonal:

$$\min_a [s - Xa]^T W [s - Xa]$$

The solution for the weighted least squared problem is determined according to the following equation:

$$a = \left[\left(X^T W X\right)^{-1} X^T W\right] s$$

Thus, in an exemplary embodiment, the sampling of the signal is in regular intervals (evenly spaced pixels), the scale of the range of x may be arbitrarily assigned. This describes the parametrically fitting of a first signal observed across a first of two dual-pixels of the dual-pixel sensor in the direction of the dual-pixel split. The same method can be used to parametrically fit a second signal observed across a second of two dual-pixels of the dual-pixel sensor in the direction of the dual-pixel split. Additionally the signal may be zero centered to facilitate calculations. For example if the number of samples is N=2m+1, we can make x range from −1.0 to +1.0 in increments of 1/m. Thus the matrix X has entries:

$$X_{i,j} = \left(\frac{i-1}{m} - 1\right)^{p+1-j}$$

Since the matrix X and the weighting matrix W are predetermined, the expression $(X^T W X)^{-1} X^T W$ can be pre-calculated as a linear regression function on samples of s such that $$a = Rs \tag{0}$$

And thus the signal as a function of position x can be approximated by a polynomial with coefficients Rs $$s(x) \approx p(x; Rs)$$

Figure 3A:
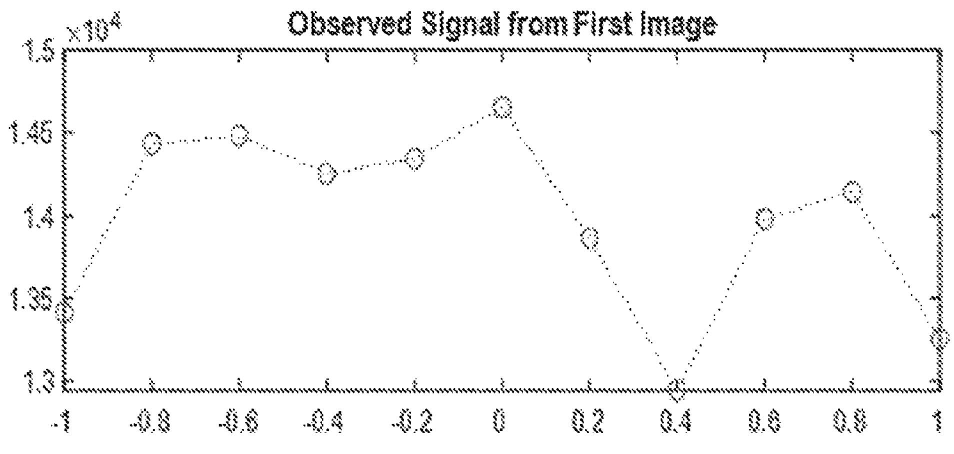
FIGS. 3A-3C illustrate observed signals and processing performed thereon according to the present disclosure.
Figure 3B:
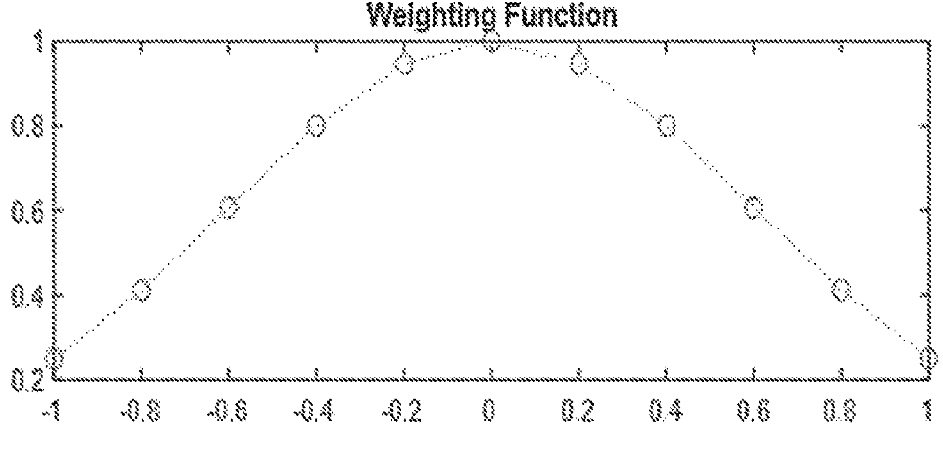
Figure 3C:
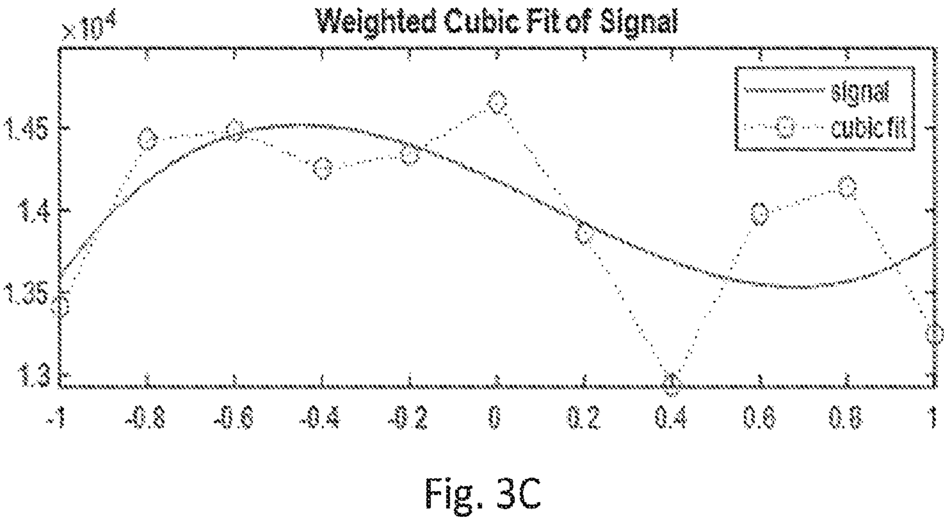

An example signal is shown in 3A-3C where a signal in the horizontal direction of a first image centered at zero is shown on a scale from −1 to 1 in FIG. 3A. In FIG. 3B, a sample weighting function is shown which weighs higher each sample's (from FIG. 3A) contribution to the polynomial regression fitting error. In FIG. 3C a cubic polynomial fit of the signal using the error weighting is illustrated. As such, FIGS. 3A-3C illustrate an exemplary observed signal from a first image of a dual-pixel signal and the weighting function used to weigh the regression error of a polynomial fit along with the polynomial (cubic) fit of the signal via a center weighted regression.

Importantly, the image processing technique performs an analysis of the alignment error of the two polynomials. In an exemplary embodiment, two functions are sampled representing the same underlying phenomena but potentially locally misaligned. By approximating both signals locally as polynomials, a focus of the processing can be on the alignment error of the two polynomials. As such, the alignment error from a shift of δ of the two polynomials can be given by $$J(a, b, \delta) = \int_{-\infty}^{\infty} G(x)\left[p(x+\delta; a) - p(x; b)\right]^2 dx \tag{1}$$

Where G(x) is a (windowing) weighting function giving higher weight at x=0 and symmetrically decreases the weighting of the polynomial error as x moves away from zero. This is illustrated in FIGS. 4A-4D which represent observed signals and various weights applied thereto as disclosed herein. FIG. 4A illustrates an observed signal from a first dual pixel image (e.g. the left pixel intensities of the dual pixels). FIG. 4B illustrates an observed signal from the second dual pixel image (e.g. the right pixel intensities of the dual pixels). FIG. 4C illustrates the weighted cubic fit of the two signals with error weighting to prioritize the fit of the center of the signal and FIG. 4D illustrates the squared error weighted by a Gaussian windowing function. As such, FIGS. 4A and 4B illustrate two corresponding dual pixel signals at the same location. In FIG. 4C, the center focused cubic regression functions of the two signals are shown whereas in FIG. 4D, the squared error at δ=0 weighted by a continuous Gaussian kernel, which is the function inside the integral of equation (1), is shown. In FIGS. 4A-4D we see two signals on the left (FIG. 4A) and right side (FIG. 4B) of the dual pixel fit to cubic polynomials (FIG. 4C) with more importance given toward the center pixel of this signal when performing the cubic regression. And finally for a given delta (namely zero in this example) we plot (FIG. 4D) the squared error across the continuous signals (weighted by a weighting function given higher weight to the errors around zero). As we will describe, the total error in FIG. 4D (calculated by integrating the signal) can be calculated for any given shift δ. The ultimate goal is to determine the value of δ that will produce the smallest alignment error. This δ, or signal shift correlates to how out of focus the point is and how much the focus would need to change to bring these two signals into alignment (e.g. into focus).

Turning now to more details on embodiments to determine shift in a fast manner. To do so we first describe how to represent polynomials of two variables. We note that the polynomial p(x+δ; a) can be written in a symmetric form $$p(x+\delta; a) = x_p^T \beta(a) \delta_p$$

where $$\delta_p = [\delta^p, \ldots, \delta, 1]^T$$

where β(a) is a lower anti-triangular matrix, where the anti-triangular bands starting from the center band are given by:

$$\begin{gathered}
a_p\left[\binom{p}{0}, \binom{p}{1}, \ldots, \binom{p}{p}\right] \\
a_{p-1}\left[\binom{p-1}{0}, \binom{p-1}{1}, \ldots, \binom{p-1}{p-1}\right] \\
\vdots \\
a_0
\end{gathered}$$

Where $$\binom{p}{n}$$

is the binomial coefficient defined as $$\binom{p}{n} = \frac{p!}{n!\,(p-n)!}$$

For example, for illustrative purposes, if p=3:

$$\beta(a) = \begin{bmatrix} 0 & 0 & 0 & a_3 \\ 0 & 0 & 3a_3 & a_2 \\ 0 & 3a_3 & 2a_2 & a_1 \\ a_3 & a_2 & a_1 & a_0 \end{bmatrix}$$

This allows us to revisit the alignment error of two Polynomials where the alignment error for the two polynomials from equation (1) as $$J(a, b, \delta) = \int_{-\infty}^{\infty} G(x)\left[x_p^T(\beta(a)\delta_p - b)\right]^2 dx \tag{2}$$

The inner term $x^T(\beta(a)\delta_p - b)$ is a polynomial of both x, and $\delta$, which can be described via a matrix C as $$x_p^T C(a, b)\delta_p = x_p^T(\beta(a)\delta_p - b)$$

And thus C is $$C(a, b) = \beta(a) - b \cdot [0, \ldots, 0, 1]$$

And we note that $$\left[x_p^T C(a, b)\delta_p\right]^2$$

can be expressed with the matrix D which is the 2-d convolution of C with itself:

$$\left[x_p^T C(a, b)\delta_p\right]^2 = x_{2p}^T D(a, b)\delta_{2p}$$

Where D represents a polynomial of both x, and $\delta$ both of order 2p. Thus D is a (2p+1) by (2p+1) lower anti-diagonal matrix.

Equations 1 and 2 both contain a weighting function G(x). The weighting function can be a Gaussian function with zero mean and a standard deviation of $\sigma$. Thus the objective of minimizing alignment error can be rewritten as:

$$G(x) = \frac{1}{\sqrt{2\pi\sigma^2}} e^{-\frac{x^2}{2\sigma^2}} \tag{3}$$

$$J(a, b, \delta) = \int_{-\infty}^{\infty} G(x) x_{2p}^T D(a, b)\delta_{2p} dx = \left[\int_{-\infty}^{\infty} G(x) x_{2p}^T dx\right] D(a, b)\delta_{2p}$$

Here the first term in square brackets provides a vector of Gaussian central moments $g_{2p}$ with elements:

$$g_k = \int_{-\infty}^{\infty} G(x) x^k dx = \begin{cases} \sigma^k (k-1)!!, & k \text{ even}, k \neq 0 \\ 0, & k \text{ odd} \\ 1, & k = 0 \end{cases} \tag{4}$$

Where (k–1)!! is the double factorial of (k–1):

$$(k-1)!! = (k-1)(k-3) \ldots (1) = \frac{k!}{2^{\frac{k}{2}}\left(\frac{k}{2}\right)!}$$

Thus, the main objective function (error function) is rewritten as $$J(a, b, \delta) = g_{2p}^T D(a, b)\delta_{2p} \tag{5}$$

where $$g_{2p}^T = [g_{2p}, \ldots, g_0]$$

are the central moments of a zero mean Gaussian given by equation (4) as a function of $\sigma$.

In some cases, to improve the alignment results multiple signals are aligned simultaneously via a weighted sum of alignment objectives to find a single shift value $\delta$. In this case a set of reference signals are from k=–w, . . . , +w are fit via polynomial regression along with a corresponding set of alignment signals yielding $A=a_{-w}, \ldots, a_w)$ and $B=\{b_{-w}, \ldots, b_w\}$, generating a composite objective $$J(A, B, \delta) = \sum_{i=-w}^{w} \omega_i J(a_i, b_i, \delta) \tag{6}$$

$$J(A, B, \delta) = g_{2p}^T\left[\sum_{i=-w}^{w} \omega_i D(a_i, b_i)\right]\delta_{2p} \tag{7}$$

where $\omega_i$ is a windowing/weighting function. To find the optimal shift, $\delta$, we perform minimization on the above objective over $\delta$. A convenient weighting function is again the zero mean Gaussian function. The parameter $\sigma$ may be the same as the continuous signal weighting Gaussian function, or may be different. Other weighting functions are also possible such as a binomial weighting, triangular function weighting, or box function weighting to name a few examples. Equation 7 shows a bilinear measure on the two signals' fitting parameters.

Processing is then performed to solve for the optimal shift whereby an objective is to minimize the composite objective of equation (6) and (7). In one embodiment, a root finding processing method is employed which obtains the derivative of the objective function and sets it equal to zero as a necessary condition of an extrema point in the alignment error. From equation (7), taking the derivative we get $$0 = \frac{\partial}{\partial\delta} J(A, B, \delta) = g_{2p}^T\left[\sum_{i=-w}^{w} \omega_i D(a_i, b_i)\right]\frac{\partial}{\partial\delta}\delta_{2p} \tag{8}$$

And $\frac{\partial}{\partial\delta}\delta_{2p}$ is $$\frac{\partial}{\partial\delta}\delta_{2p} = \left[2p\delta^{2p-1}, (2p-1)\delta^{2p-2}, \ldots, 2\delta, 1, 0\right]^T = \text{Diag}([2p, \ldots, 0])\begin{bmatrix}\delta_{2p-1} \\ 0\end{bmatrix}$$

The necessary condition can be solved via a polynomial root finding algorithm. In many cases the minima of interest in the objective function is the minima near δ=0. As such, the objective function may be minimized via a gradient descent type method starting at δ=0. It should be noted that equation (8) still involves a bilinear measure on the two signals' fitting parameters.

For the minimization using the gradient descent from a starting point, the objective written J(δ) for short, can be approximated with N terms via a Maclaurin Series about some point $\delta_n$:

$$J_N(\delta;\delta_n)=\sum_{n=0}^{N}\frac{(\delta-\delta_n)^n}{n!}J^{(n)}(\delta_n)$$

Using N=2, the error is approximated with a quadratic about the point $\delta_n$ and this approximation may be minimized over $\delta_{n+1}$ $$\min_{\delta_{n+1}} J_2(\delta_{n+1};\delta_n)=\min_{\delta_{n+1}} J(\delta_n)+(\delta_{n+1}-\delta_n)J'(\delta_n)+\frac{(\delta_{n+1}-\delta_n)^2}{2}J''(\delta_n)$$

Processing is performed to minimize by taking the derivative of the quadratic approximation and setting it equal to zero yielding the updated equation $$\delta_{n+1}=\delta_n-\frac{J'(\delta_n)}{J''(\delta_n)}$$

Figure 5:
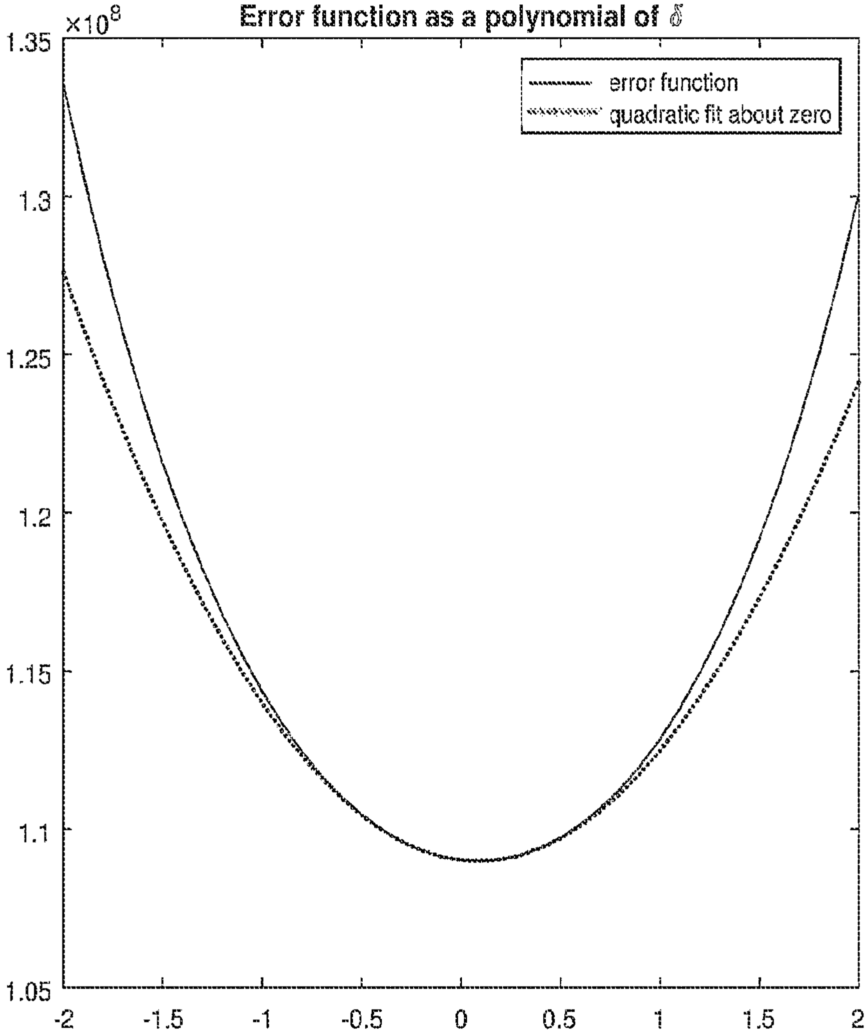
FIG. 5 is a graph illustrating alignment error of two signals according to the present disclosure.

This advantageously enables an embodiment using a one-step quadratic approximation to be performed where this iteration may only involve a single step to arrive at a good estimate for delta:

$$\delta_1=\frac{J'(0)}{J''(0)}=\frac{\left[g_{2p}^T\left[\sum_{i=-w}^{w}\omega_i D(a_i,b_i)\right]\right]_1}{2\left[g_{2p}^T\left[\sum_{i=-w}^{w}\omega_i D(a_i,b_i)\right]\right]_2} \quad (9)$$

where $[v]_k$ signifies the k-th order element of the polynomial coefficient vector v. FIG. 5 shows an example error function J(δ) for two corresponding dual-pixel image patches and the quadratic approximation of the error function about δ=0. The observation of a typical alignment function such as the one shown herein, along with the expectation that the solution for δ is typically close to zero, provides the motivation to approximate the function with a quadratic and to use the one step solution approximation as described by equation (9). Indexing into the $1^{st}$ and $2^{nd}$ order coefficients of the delta polynomial coefficient vector only involves two rows of the matrix $D(a_i, b_i)$. Furthermore, the vector $$g_{2p}^T$$

when using the Gaussian weighting function is non-zero for every other element. Thus, while D is a (2p+1)×(2p+1) matrix containing $4p^2+4p+1$ coefficients (or actually $2p^2+3p+1$ elements that are non-zero in the lower anti-triangular matrix), only 2p terms in the matrix D are used. This indicates for the one-step approximate solution in (9) the D matrix need not be fully computed for each $(a_i, b_i)$ pair to arrive at a solution thereby reducing processing power and computational cost of the apparatus executing the algorithm.

The validity of the above solution may be judged via the denominator of equation (9) which is a measure of the convexity of the function. A largely positive denominator would generate a better solution than a denominator close to zero. The solution will fail when the denominator is zero, in which case the zero shift solution is sometimes preferred. Also if the denominator is negative, the solution is a maxima instead of a minima, and the solution should be avoided. In some cases, the zero shift or a shift at the bounds of the acceptable shift range should be used (the two boundary conditions can be tested to determine which produces less error).

The above is advantageously applied to performing dual pixel alignment for depth estimation. The following description outlines the steps for fast generation of alignment errors for various points in a pair of two dual pixel images. Given a respective point in a pair of dual pixel images $I_L$ and $I_R$. A window size of (2w+1) x (2w+1) centered around the point are sampled from the two images. Each windowed sampled represents a collection of 1-dimensional signals in the direction of the dual pixel split (e.g. horizontally). Thus a sampled patch from the left and right images $$P_L=\begin{bmatrix} - & \overleftarrow{s}_{-w} & - \\ & \vdots & \\ - & \overleftarrow{s}_{+w} & - \end{bmatrix},\ P_R=\begin{bmatrix} - & \vec{s}_{-w} & - \\ & \vdots & \\ - & \vec{s}_{+w} & - \end{bmatrix}$$

In these matrices $\overleftarrow{s}_j$ is the left pixel signal of 2w+1 samples shifted j pixels down from the center of the target patch to align. Thus $P_L$ is a patch of the image generated from the left side of the pixels in a dual pixel sensor centered around the location of interest/analysis. Similarly $P_R$ is an image made up of corresponding pixel locations but taken from the right side of the pixels in the dual pixel sensor. Thus the polynomial approximations of the patch signals may be calculated from equation (0) and used in equation (7) as $$A=RP_L^T, \text{ and } B=RP_R^T$$

And $a_i$ denotes the corresponding column i of the matrix.

Next for each pair of columns, e.g. $(a_i, b_i)$, from the left and right regression coefficient matrices A and B, the matrix is constructed $$C(a_i,b_i)=\beta(a_i)-b_i\cdot[0,\ldots,0,1]$$

where $\beta(a_i)$ is the lower anti-triangular matrix derived from $a_i$ as described earlier in this document. For each i we derive the matrix $D(a_i, b_i)$ from $C(a_i, b_i)$ by performing a 2-dimensional auto-convolution on $C(a_i, b_i)$. In some cases not all elements of $D(a_i, b_i)$ are calculated. Processing is then performed to compute $$g_{2p}^T\left[\sum_{i=-w}^{w}\omega_i D(a_i,b_i)\right]$$

(or at least some of the terms of this vector—since some terms ultimately may not play into the final solution)).

Finally, the optimal δ is estimated from the above polynomial coefficients based on one of the methods laid out above (e.g. the root finding method or equation (9)).

Based on the above further reduction in the necessary computation needed to solve for the estimate of delta is advantageously obtained by using a polynomial order of 3. Thus, from the matrix D, only 6 of the 49 terms in the matrix need to be computed with 3 of the 6 terms used for the calculation of the first derivative in equation (9), and the other 3 are used for the calculation of the second derivative. This is performed for each D matrix in the 2w+1 regressed lines in the patch. A matrix G is defined that describes the 3 terms for each row in a patch, a 3x(2w+1) matrix, where the i-th column is given by the i-th regression coefficients a and b $$G_i = \begin{bmatrix} 2a_2 e_3 + 3a_3 e_2 \\ 3a_3 e_0 + 2a_2 e_1 + a_1 e_2 \\ a_1 e_1 \end{bmatrix} \tag{10}$$

where e is defined as $$e = a - b$$

A matrix H is also defined that describes the 3 terms for each row patch, a 3x(2w+1) matrix, where the i-th column is given by the i-th regression coefficients a and b $$H_i = \begin{bmatrix} 3a_3(3a_3 + 2e_3) \\ 2a_2(2a_2 + e_2) + 6a_3(a_1 + e_1) \\ a_1^2 + 2a_2 e_0 \end{bmatrix} \tag{11}$$

From these expressions equation (9) can be rewritten as $$\delta_1 = \frac{J'(0)}{J''(0)} = \frac{2\tilde{g}^T G w}{2\tilde{g}^T H w + \lambda} \tag{12}$$

where G, H, $\tilde{g}^T$ and $w^T$ are $$G = [G_1, G_2, \ldots, G_{2w+1}]$$

$$H = [H_1, H_2, \ldots, H_{2w+1}]$$

$$\tilde{g}^T = [15\sigma^4, 3\sigma^2, 1]$$

$$w^T = [\omega_{-w}, \ldots, \omega_0, \ldots, \omega_w]$$

From this, the following is true:

$$E = [e_1, \ldots, e_{2w+1}] = A - B = RP_L^T - RP_R^T = R(P_L^T - P_R^T) \tag{13}$$

So, the coefficients for E can be generated through the regression matrix applied to the difference of the two dual-pixel images' centered patches. Also the values, $3a_3$, $2a_2$, and $a_1$ recur in equations (10) and (11) and the value of $a_0$ does not occur at all. Thus the patch $$P_L^T$$

can be regressed to produce only $3a_3$, $2a_2$, and $a_1$ using a regression matrix S $$\tilde{A} = \begin{bmatrix} 3a_3 \\ 2a_2 \\ a_1 \end{bmatrix} = \left\{ \begin{bmatrix} 3 & 0 & 0 & 0 \\ 0 & 2 & 0 & 0 \\ 0 & 0 & 1 & 0 \end{bmatrix} R \right\} P_L^T = SP_L^T \tag{14}$$

where S can be pre-calculated as a 3×4 matrix which requires less computation to apply than using R. Because of this the algorithm described in FIG. 2 is possible. In equation (12) the numerator and denominator both involve a bilinear measure on the two signals' fitting parameters. Furthermore the denominator can determine an alignment confidence based at least in part on the at least one bilinear measure on the at least two signals' fitting parameters. The shift estimate of equation (12) is the sub-pixel alignment estimate based at least in part on the at least one bilinear measure on the at least two signals' fitting parameters (e.g. the numerator and the denominator). When other methods are used to fine the shift the solution still involves a bilinear measure on the at least two signals' fitting parameters (e.g. solving equation (8) using a root finding method).

In FIG. 2, the flow starts in 205 and moves to 210 where parameters are pre-calculated. In some example embodiments, the system pre-calculates the polynomial regression matrix R, the continuous even central moments $\tilde{g}^T$, and the cross direction weighting vector w, and λ. λ is a regularization parameter which can the reciprocal of a delta standard deviation prior about zero for example or some other small number. Flow then moves to block 220 where a location in the image is selected for processing. The flow then moves to block 230.

Some embodiments of block 230 estimate Ã from equation (14) and E from equation (13) for the patch, and patch difference surrounding the pixel (note if patches overlap from one pixel to the next, some columns of Ã and E may be reused from calculations of a previous pixel). Other embodiments compute other linear transformations on the patch around the selected location to process.

Next flow moves to block 240 where additional non-linear processing takes place based on the linear processing performed in the previous step. For example, some embodiments calculate G and H from equations (10) and (11) using a bilinear combination of the results found in block 230. Other embodiments use the 2-D convolution of a matrix containing the block 230 results such as described by the matrix D derived from equation (2) above. Other embodiments process this step through other non-linear functions of the results from block 230 such as non-linear activations and network layers in a neural network.

Flow then moves to block 250 where a confidence measure and a shift measure are computed for the location. In some embodiments we calculate $\tilde{g}^T Hw$ as a confidence measure (a measure of convexity at 0). Some embodiments also calculate $\tilde{g}^T Gw$ and combine that result with the confidence measure to compute the delta (shift) estimate such as is described in equation (12). This term may determine a confidence based at least in part on the at least one bilinear measure on the at least two signals' fitting parameters.

In block 260 it is determined if there are more locations to process. If so, flow returns to 220. In some embodiments the flow from 220 to 250 can be done in parallel for multiple locations simultaneously via multiple processing units such as a multicore CPU, a GPU, or a TPU, or other specialized and parallelize hardware for example. If all locations have been processed, the shift/delta maps and confidence maps are returned from the module in block 270 and flow then ends in block 280. Based on the output a confidence threshold may be determined and a map of delta values for the pixels above the confidence threshold can be generated.

Figure 6:
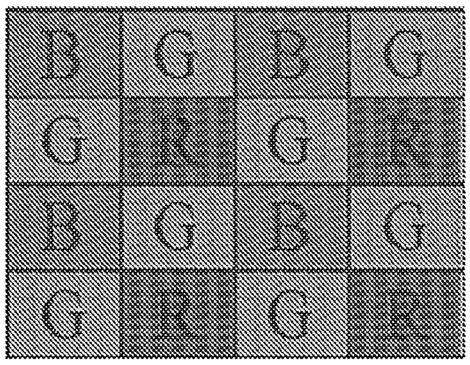
FIG. 6 illustrates an exemplary pixel array according to the present disclosure.

For raw dual-pixel data, examination of the data in Bayer format is performed. The format usually interlaces pixels in a quad pattern such as shown in FIG. 6. In this case, the Blue channels (B) and Red channels (R) can be processed by sub-sampling every other row and column of the raw data, centered at a Red or Blue pixel. This process follows the approach previously described. For the Green channels, every other row is staggered with respect to the previous row. Thus, one row (for example the center row in the patch) may be regressed as outlined above with 2w+1 samples (from −2w, −2w+2, . . . , 0, . . . , 2w−2, 2w). The preceding and subsequent row can be sampled with 2w samples at (−2w+1, −2w+3, . . . , −3, −1, 1, 3, . . . , 2w−3, 2w−1). For the staggered rows, the regression matrix will be different because the sampling is different. For example, when weighing signals across multiple rows, the regression matrix used for alternating rows will need to change to account for the staggered G pattern as seen in FIG. 6.

Figure 7:
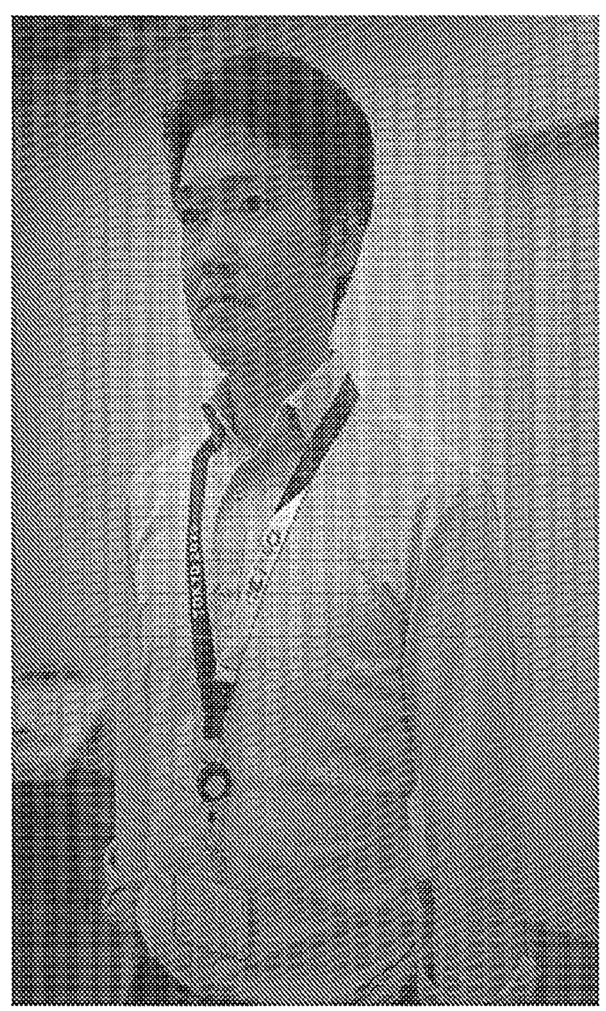
FIG. 7 illustrates an exemplary image input prior to depth map processing being performed according to FIG. 2.

FIG. 7 illustrates an example rotated input image taken from one channel of the raw dual pixel image. The image is in portrait mode and is therefore rotated for viewing purposes. Due to variations in intensities across the dual pixel images due to optical pathway and sensor variations, the first image and the second image may be intensity adjusted. One such adjustment method, profiles the ratio of the two images for each channel and takes the median across each column of the un-rotated image. The adjustment factor is fit to a low order polynomial or other smooth function to account for regions with large depth changes across the dual-pixels.

Figures 8A, 8B, 8C:
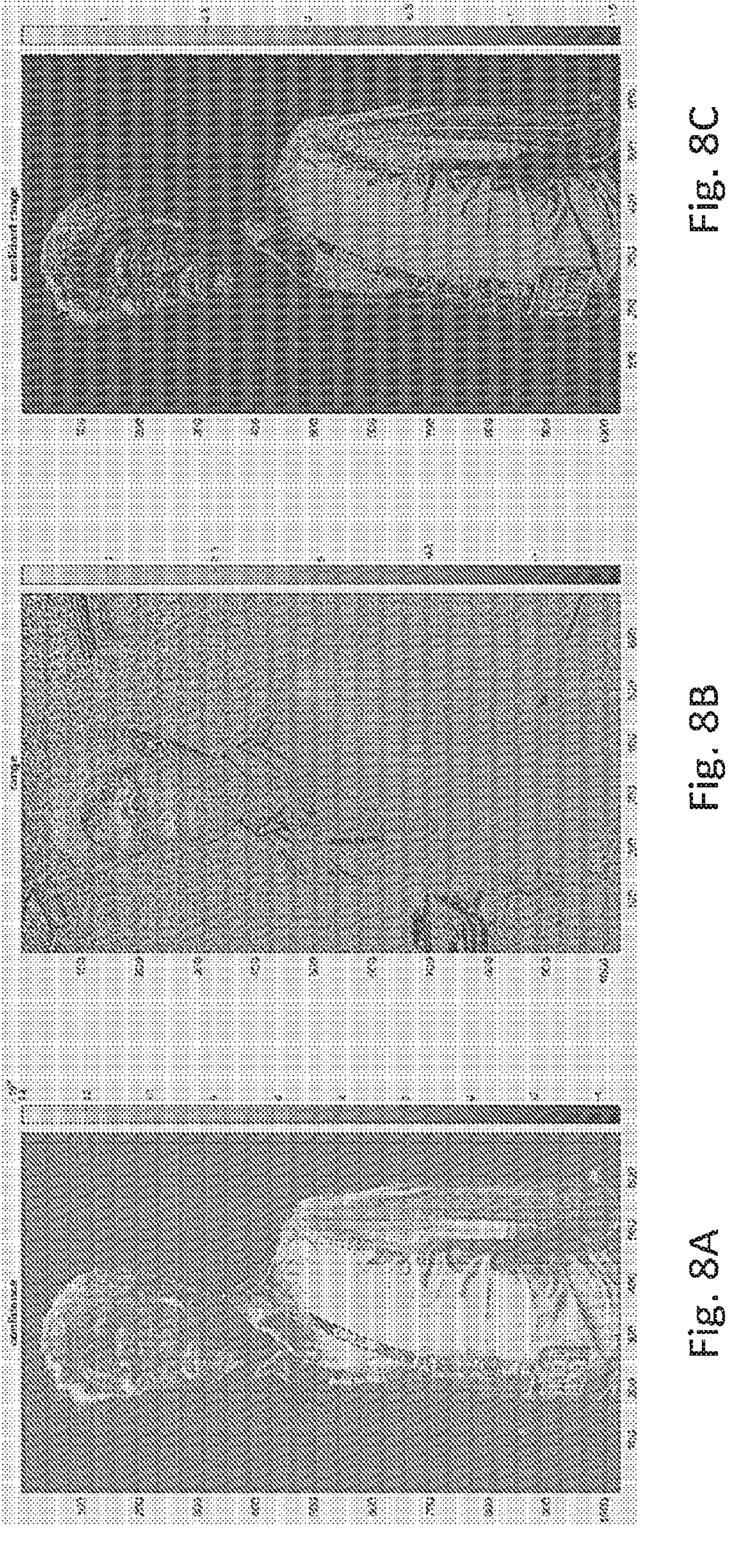
FIGS. 8A-8C illustrate the result of the depth map processing of FIG. 2.

FIGS. 8A-8C show the results from the dual-pixel alignment tasks for the input images. FIG. 8A shows the confidence map of the dual-pixel alignment which represents the second derivative of the approximated error function. The second derivative is a measure of the objective convexity near zero, and informs the confidence value such that the one step approximation method leads to a good approximation of the local minima near zero. FIG. 8B shows the local minima for delta for all pixels bounded from about −1.5 to 1.5 pixels and FIG. 8C shows the delta value estimates for the pixels of high confidence only.

The red, green, and blue channels of the image each produce different confident delta maps. These results may be combined to produce a fused delta map. In some embodiments, the confidence map is converted to a confidence score from zero to one via a sigmoid function. The function maps high confidence points to 1.0 and low confidence scores to 0.0 and produces a score in-between for mid confidence. These scores can be combined to produce a softmax like weighting that is then used to average the results of the three channels. However, if all of the confidence scores are low, the point will not be estimated. Additionally there may exist biases or scaling in the delta estimates across the 3 channels. To adjust for this, pixels confident in all channels may be compared by normalizing the three delta values such that the green channel delta value is one. Then, the median of the other 2 channels may indicate a relative adjustment scale that may be applied before averaging across multiple channels. Depth information from sub-pixel alignment estimates can be obtained by estimating based on disparity calculations for a given focal length and given pixel spacing.

$$z = \frac{f}{(1 + 2\delta)\Delta_{pix}}$$

where f is the focal length and $\Delta_{pix}$ is the pixel spacing in the same units.

As such, the present disclosure advantageously provides a real time system and method for sensing a scene and inferring a Red, Green, Blue, Depth estimation from existing commonly available sensors. Since the method is capable of real-time performance it may be used to augment video. The addition of depth estimation to the camera output enables applications in image editing, object recognition by providing richer data than what is typically generated. It can enable robotic applications, it can be used for VR applications, gaming, automotive sensing, fast background removal, just to name a few applications.

As such, the above illustrates a method for generating a sub-pixel alignment estimate from dual-pixel sensor data. This method is embodied as computer readable instructions stored in memory that are executed by one or more processors of an information processing apparatus. The stored instructions, when executed, cause the apparatus to parametrically fit at least two signals observed across a two dual-pixels of the dual-pixel sensor in the direction of the dual-pixel split, generate at least one bilinear measure on the at least two signals' fitting parameters, determine an alignment confidence based at least in part on the at least one bilinear measure on the at least two signals' fitting parameters, and determining the sub-pixel alignment estimate based at least in part on the at least one bilinear measure on the at least two signals' fitting parameters. In certain embodiments, the depth of a pixel relative to the focus depth based is estimated at least in part on the lens focal length and pixel spacing and the sub-pixel alignment estimate. Further, a sub-pixel alignment map for an image is estimated by repeatedly applying the above to a plurality of dual-pixels in an image. In certain embodiments, a mesh containing sets of vertices and surfaces including one or more textures is generated based on the subpixel alignment estimate.

At least two signals observed across a two dual-pixels of the dual-pixel sensor in the direction of the dual-pixel split includes parallel scan lines across the dual pixels for a patch centered at the location of the alignment estimate and a weighting of the parallel scan lines is applied and the weighting weighs more scan lines central to the patch.

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

Additionally, some embodiments of the devices, systems, and methods combine features from two or more of the embodiments that are described herein. Also, as used herein, the conjunction "or" generally refers to an inclusive "or," though "or" may refer to an exclusive "or" if expressly indicated or if the context indicates that the "or" must be an exclusive "or."

While the present disclosure has been described with reference to exemplary embodiments, it is to be understood that the invention is not limited to the disclosed exemplary embodiments.

I claim:

1. A method for generating a sub-pixel alignment estimate from dual pixel sensor data, the method comprising:

generating a parametric function by parametrically fitting a first pixel-by-pixel signal from samples obtained from a first pixel element of the dual-pixel sensor in a direction of a dual pixel split such that the generated parametric function includes a first continuous function with first fitting parameters, parametrically fitting a second pixel-by-pixel signal from samples obtained from a second pixel element of the dual pixel sensor in the direction of the dual pixel split, wherein the samples obtained from the second pixel element correspond to respective samples obtained from the first pixel element, and the generated parametric function includes a second continuous function with second fitting parameters;

determining an optimal continuous valued shift to the second continuous function that minimizes a difference between the first continuous function and the second continuous function by generating at least one bilinear measure on respective first and second fitting parameters of at least two continuous valued functions, and using the determined optimal continuous valued shift based at least in part on the at least one bilinear measure on respective first and second fitting parameters to determine the sub-pixel alignment estimate.

2. The method of claim 1 further comprising estimating the depth of a pixel relative to the focus depth based at least in part on the lens focal length and pixel spacing and the sub-pixel alignment estimate.

3. The method of claim 1 further comprising, estimating a sub-pixel alignment map for an image by processing a plurality of dual pixels in an image.

4. The method of claim 1 wherein the obtained first pixel-by-pixel signal and the second-pixel-by-pixel signal of the dual-pixel sensor in the direction of the dual-pixel split include parallel scan lines across the dual pixels for a patch centered at the location of the alignment estimate.

5. The method of claim 4 wherein a weighting of the parallel scan lines is applied.

6. The method of claim 5 wherein the weighting weighs higher scan lines central to the patch.

7. The method of claim 1, further comprising generating, based on the sub-pixel alignment estimate, a mesh containing sets of vertices and surfaces including one or more textures.

8. An apparatus that generates a sub-pixel alignment estimate from dual-pixel sensor data comprising:

one or more memories storing instructions;

one or more processors that, upon execution of the instructions are configured to generate a parametric function by parametrically fitting a first pixel-by-pixel signal from samples obtained from a first pixel element of the dual pixel sensor in a direction of a dual pixel split such that the generated parametric function includes a first continuous function with first fitting parameters, and parametrically fitting a second pixel-by-pixel signal from samples obtained from a second pixel element of the dual pixel sensor in the direction of the dual pixel split, wherein the samples obtained from the second pixel element correspond to respective samples obtained from the first pixel element, and the generated parametric function includes a second continuous function with second fitting parameters, determine an optimal continuous valued shift to the second continuous function that minimizes a difference between the first continuous function and the second continuous function by generating at least one bilinear measure on respective first and second fitting parameters of at least two continuous valued functions, and use the determined optimal continuous valued shift based at least in part on the at least one bilinear measure on respective first and second fitting parameters to determine the sub-pixel alignment estimate.

9. The apparatus of claim 8, wherein execution of the instructions further configures the one or more processors to estimate the depth of a pixel relative to the focus depth based at least in part on the lens focal length and pixel spacing and the sub-pixel alignment estimate.

10. The apparatus of claim 8, wherein execution of the instructions further configures the one or more processors to, estimate a sub-pixel alignment map for an image by processing a plurality of dual pixels in an image.

11. The apparatus of claim 8, wherein the obtained first pixel-by-pixel signal and the second-pixel-by-pixel signal of the dual-pixel sensor in the direction of the dual-pixel split includes parallel scan lines across the dual pixels for a patch centered at the location of the alignment estimate.

12. The apparatus of claim 11 wherein a weighting of the parallel scan lines is applied.

13. The apparatus of claim 12 wherein the weighting weighs higher scan lines central to the patch.

14. An apparatus that generates color and depth data comprising:

one or more memories storing instructions;

one or more processors that, upon execution of the instructions are configured to read data from a dual-pixel RGB sensor array, generate a parametric function by parametrically fitting a first pixel-by-pixel signal from samples obtained from a first pixel element of the dual pixel sensor in a direction of a dual pixel split such that the generated parametric function includes a first continuous function with first fitting parameters, and parametrically fitting a second pixel-by-pixel signal from samples obtained from a second pixel element of the dual pixel sensor in the direction of the dual pixel split, wherein the samples obtained from the second pixel element correspond to respective samples obtained from the first pixel element, and the generated parametric function includes a second continuous function with second fitting parameters, determine an optimal continuous valued shift to the second continuous function that minimizes a difference between the first continuous function and the second continuous function by generating at least one bilinear measure on respective first and second fitting parameters of at least two continuous valued functions, and use the determined optimal continuous valued shift based at least in part on the at least one bilinear measure on respective first and second fitting parameters to determine the sub-pixel alignment estimate, generate the color and depth data based on the color information from the dual-pixel sensor array and from the sub-pixel alignment estimate, and store or transmit the generated color and depth data.

15. The method according to claim 1, further comprising determining an alignment confidence based at least in part on the at least one bilinear measure on respective first and second fitting parameters.

16. The apparatus according to claim 8, wherein execution of the stored instructions further configures the one or more processors to determine an alignment confidence based at least in part on the at least one bilinear measure on respective first and second fitting parameters.

17. The apparatus according to claim 14, wherein execution of the stored instructions further configures the one or more processors to determine an alignment confidence based at least in part on the at least one bilinear measure on respective first and second fitting parameters.

* * * * *